(No Model.) 3 Sheets—Sheet 1.

C. M. RIBON.
MACHINE FOR THE MANUFACTURE OF POTTERY.

No. 282,369. Patented July 31, 1883.

Witnesses.
Aaron Wolff
D. DeLeon

Inventor.
Carlos Martinez Ribon
per D. De Sola
Attorney (No Model.)

3 Sheets—Sheet 3.

C. M. RIBON.
MACHINE FOR THE MANUFACTURE OF POTTERY.

No. 282,369.  Patented July 31, 1883.

Witnesses.
Aaron Wolff
D. DeLeon

Inventor.
Carleton Martinez Ribon
per D. De Sola, Attorney

UNITED STATES PATENT OFFICE.

CERBELEON MARTINEZ RIBON, OF MOMPOS, BOLIVAR, UNITED STATES OF COLOMBIA.

MACHINE FOR THE MANUFACTURE OF POTTERY.

SPECIFICATION forming part of Letters Patent No. 282,369, dated July 31, 1883.

Application filed September 24, 1881. (No model.)

*To all whom it may concern:*

Be it known that I, CERBELEON MARTINEZ RIBON, of Mompos, in the State of Bolivar, United States of Colombia, have invented a new and useful Improvement in Machines for the Manufacture of Pottery, of which the following is a full, clear, and exact description, reference being had to the annexed drawings, forming part of this specification.

This invention has for its prime object the provision of a suitable mold for making earthenware with concavo-convex surfaces, and especially with recessed bottoms, where an annular rim is formed as a base for the vessel.

The invention consists, first, in constructing the mold of two vertically-divided parts, and a third part, which is inclosed within said parts, whereby the mold may be securely held together in a jigger to be run by power; and, second, in combining with such a mold an adjustable knife adapted to be used in the manufacture of concavo-convex vessels having small necks.

Figure 1:
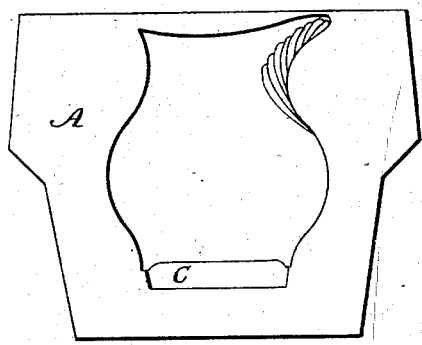
Figure 2:
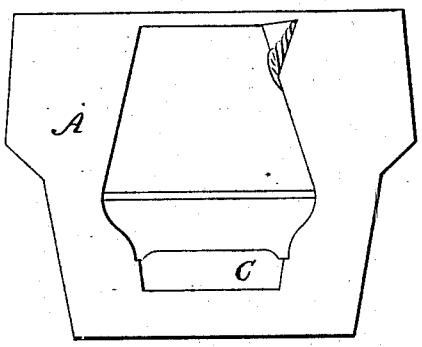
Figure 3:
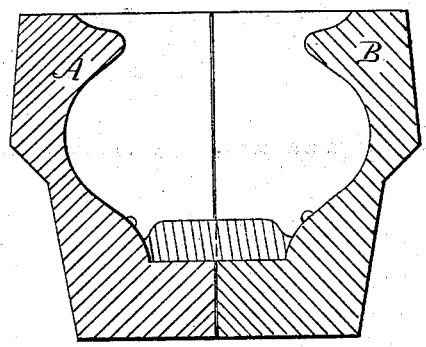
Figure 4:
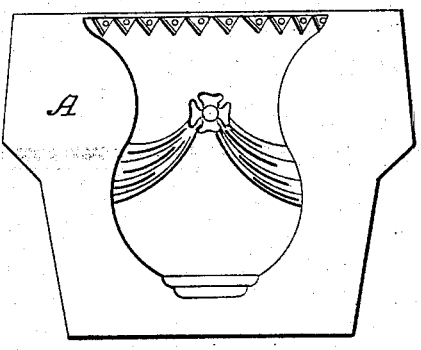
Figure 5:
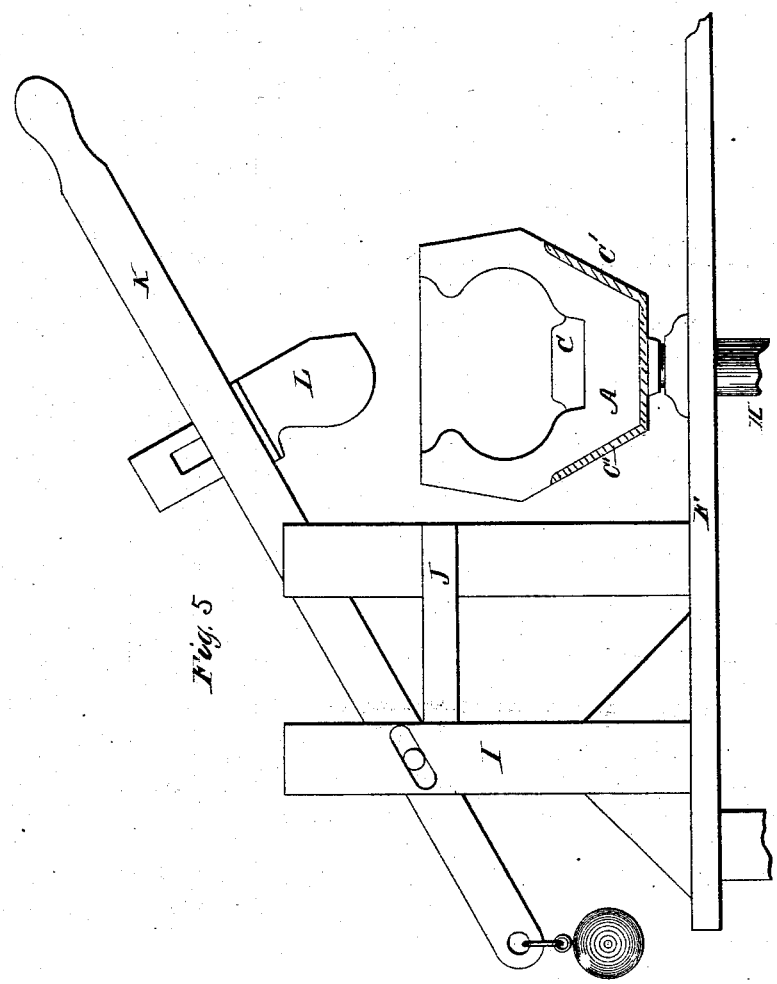

In the drawings, Figures 1, 2, 3, and 4 are views of molds adapted for forming vessels of different kinds. Fig. 5 is a side elevation of a machine adapted for use in making large-necked vessels, and Fig. 6 is a similar view of an improved machine to be used in making vessels having small necks.

The mold is formed in two parts, A B, of similar shape, which are adapted to be fitted close together on an imaginary vertical plane, and a third part, C, which is adapted to be inclosed between said parts to form a removable bottom for the mold. The part C is constructed with its center raised more or less, in order to form a recess in the bottom of the vessel, and an annular rim, which shall serve as a base for the vessel to rest upon. With this construction the vessel can be easily removed from the mold, since the part C is also removable, and may be taken apart by first removing the outer or inclosing parts, A B. The lower portion of the mold is adapted to be inserted into the jigger D, where it will be firmly held by the wedging of the mold into the same, and by the aid of a belt secured around the upper portion of the mold the outer parts will be securely bound together.

Figure 6:
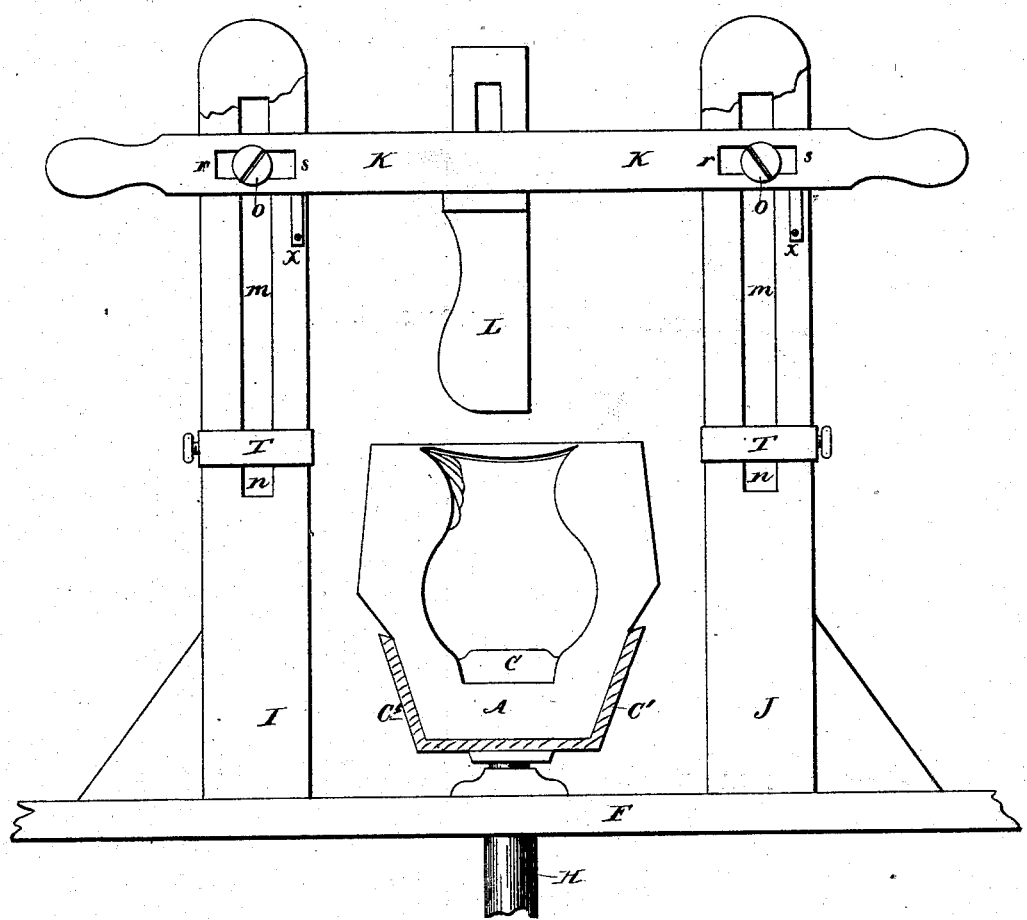

In making vessels having a large neck a machine like that shown in Fig. 5 may be employed; but if the neck of the vessel is to be small, then I provide the machine shown in Fig. 6, in which the knife L is secured to a horizontal bar, which is supported in vertically-slotted standards I J by means of bolts $o$, which are adapted to slide up and down in the slots $m$ $n$. The bar is provided with slots $r$ $s$, by which it may have a longitudinal movement independent of the bolts. The standards are provided with adjustable rests T for the bar, by means of which the bar may be supported at any desired height, and with springs $x$ for supporting the bar at a point where it will be out of the way when not in actual use.

C' represents the jigger, and H is the spindle, by which power is to be applied to the same, which is supported in the table F.

With this construction the knife L may be lowered into the mold and adjusted laterally and vertically to regulate the thickness of the vessel being manufactured.

What I claim is—

1. The mold formed of the vertically-divided parts A B and the part C, which is inclosed between said parts to form a removable bottom, substantially as shown and described, and for the purpose set forth.

2. The combination, with the mold and the jigger, of the horizontal bar K, carrying the knife L, and having slots $r$ $s$ near its ends, the standards I J, having springs $x$, slots $m$ $n$, and movable bolts $o$ in said slots, and the adjustable rests T, secured to the standards, substantially as shown and described.

CERBELEON MARTINEZ RIBON.

Witnesses:
DAVID J. DOVALE,
BERNARDO PEREIRA.